US008780413B1

(12) United States Patent
Klaus et al.

(10) Patent No.: US 8,780,413 B1
(45) Date of Patent: Jul. 15, 2014

(54) ERROR PROPAGATION DURING ERROR DIFFUSION HALFTONING

(75) Inventors: Richard I. Klaus, Ridgefield, WA (US); Randall D. Briggs, Boise, ID (US)

(73) Assignee: Marvell International Ltd., Hamilton (BM)

( * ) Notice: Subject to any disclaimer, the term of this patent is extended or adjusted under 35 U.S.C. 154(b) by 706 days.

(21) Appl. No.: 13/014,633

(22) Filed: Jan. 26, 2011

Related U.S. Application Data

(60) Provisional application No. 61/305,085, filed on Feb. 16, 2010, provisional application No. 61/332,608, filed on May 7, 2010.

(51) Int. Cl.
*H04N 1/40* (2006.01)
*G06K 15/00* (2006.01)

(52) U.S. Cl.
USPC ....... 358/3.05; 358/3.06; 358/3.01; 358/3.03; 358/1.9; 358/534; 382/252; 382/237

(58) Field of Classification Search
USPC ................ 358/3.06, 3.05, 3.01, 3.03, 1.9
See application file for complete search history.

(56) References Cited

U.S. PATENT DOCUMENTS

| 6,249,357 B1 * | 6/2001 | Metcalfe et al. ............ 358/451 |
| 2009/0219577 A1 * | 9/2009 | Couwenhoven et al. .... 358/3.03 |

* cited by examiner

*Primary Examiner* — Quang N Vo

(57) ABSTRACT

Embodiments of the present disclosure provide a method comprising processing a first pixel of a continuous tone image to generate a first error, the first error representative of a difference between an input level and an output level associated with the first pixel; and in response to processing the first pixel, assigning a random error to a second pixel that is neighboring the first pixel, wherein the assigned random error is independent of the first error. Other embodiments are also described and claimed.

15 Claims, 9 Drawing Sheets

ERROR PROPAGATION DURING ERROR DIFFUSION HALFTONING

CROSS REFERENCE TO RELATED APPLICATIONS

The present application claims priority to U.S. Patent Application No. 61/305,085, filed Feb. 16, 2010, and to U.S. Patent Application No. 61/332,608, filed May 7, 2010, the entire specifications of which are hereby incorporated by reference in their entirety for all purposes, except for those sections, if any, that are inconsistent with this specification.

TECHNICAL FIELD

Embodiments of the present disclosure relate to the field of error diffusion halftoning, and more particularly, to error propagation during error diffusion halftoning.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In order to facilitate the printing of images in a printing device, an image having continuous tones (also referred to herein as a "continuous tone image" or a "contone image") is generally converted into an image having halftones. For example, a black & white picture is reproduced in a newspaper as a grid or array of black dots, with relatively lighter areas having smaller and/or less number of dots, and relatively darker areas having larger and/or more number of dots. For very dark areas of a halftone image, the larger spots run into one another so that the dark area looks like small white spots on a black field.

Error diffusion is a type of halftoning technique, in which a quantization error associated with a pixel is distributed to neighboring pixels that have not yet been processed. For example, in a halftoning process, while processing a pixel, an input level of the pixel is quantized to generate a corresponding output level. An error is generally generated while generating the output level, where the error is associated with a difference between the input level and the output level. This error associated with the pixel is generally distributed or propagated to neighboring pixels that have not yet been processed. Thus, an output level of a pixel is generally a function of an input level of the pixel and errors accumulated from previously processed neighboring pixels (also referred to herein as an accumulated error of the pixel). Error diffusion halftoning preserves, for example, a local arithmetic mean of the image (e.g., preserves an average tone of a portion of the image).

FIG. 1 schematically illustrates error propagation in an error diffusion halftoning process. FIG. 1 illustrates a plurality of pixels for which a halftone image is to be generated. Some of the pixels in FIG. 1 are labeled using a coordinate system. For example, a first pixel is labeled as (i,j), a pixel to the immediate right of the pixel (i,j) is labeled as (i+1,j), a pixel to the immediate bottom of the pixel (i,j) is labeled as (i,j+1), and so on. In FIG. 1, the pixels illustrated using diagonal stripes have already been processed, the pixel (i,j) illustrated using vertical stripes is currently being processed, and the remaining pixels (illustrated without any stripes) are yet to be processed. A pixel that is currently being processed is also referred to herein as a target pixel. Thus, in FIG. 1, the pixel (i,j) is the target pixel.

The plurality of pixels of FIG. 1 is a part of an image page, for which a halftone image is being generated. A horizontal pixel line that includes the pixel (i−2,j−1) is a top-most horizontal pixel line of the image page, and a vertical pixel line that includes the pixel (i−2,j−1) is a left-most vertical pixel line of the image page, as illustrated in FIG. 1.

In an example, pixels are assumed to be processed from top to bottom, and from left to right. For example, pixels of the top-most horizontal pixel line are processed from left to right (i.e., pixels (i−2,j−1), . . . (i+1,j−1) are processed sequentially), then pixels in a second horizontal pixel line (i.e., the horizontal pixel line that includes pixel (i−2,j)) are processed, and so on.

A halftone output level of the target pixel (i,j) is currently being generated, based at least in part on an input level of the pixel (i,j) and an accumulated error of the pixel (i,j). For example, the accumulated error of the pixel (i,j) is based on errors propagated from pixels (i−1,j−1), (i,j−1), (i+1,j−1), and (i−1,j) while processing these pixels. An accumulated error of a pixel generally is a function of the input levels of pixels that have been recently processed. An error E1 is generated while processing the pixel (i,j). The error E1 is representative of a difference between the output level and the input level of the pixel (i,j). In an error diffusion halftoning, the error E1 is propagated or distributed to neighboring pixels that have not yet been processed. For example, $7/16^{th}$ portion of the error E1 is assigned to the pixel (i+1,j), which is to the immediate right of the pixel (i,j); $3/16^{th}$ portion of the error E1 is assigned to the pixel (i−1,j+1), which is to the immediate left-bottom corner of the pixel (i,j); and so on, as illustrated in FIG. 1.

In error diffusion halftoning, start-up artifacts generally occur at the top of an image page. For example, the accumulated error of the pixel (i−2,j−1) is zero as, for example, this pixel is the top-left most pixel of the image page (i.e., as errors from previously processed pixels have not yet propagated to the pixel (i−2,j−1)). Similarly, accumulated errors in at least some other pixels of the top-most horizontal pixel line are also close to zero (as, for example, no errors have propagated to these pixels from pixels that are at the top of these pixels). Accordingly, the portion of the generated halftone image corresponding to pixels in the top-most horizontal pixel line is generally not accurate, leading to start-up artifacts at the top of the image page. Generally, it takes awhile (e.g., after a few pixel lines have been processed) for the errors to accumulate enough to reach a new equilibrium state. For example, by the time pixel (i,j+1) is processed, the halftoning process generates sufficient accumulated errors to overcome any start-up artifact associated with pixel (i,j+1). Generally, generating sufficient accumulated errors, to overcome any start-up artifact, is based on the requested tone level of the pixels. For example, for relatively middle tones of the pixels that are processed, the artifacts tend to resolve relatively quickly. For relatively dark or light tones, the artifacts can continue for many lines.

For similar reasons, in some instances, start-up artifacts can also occur in, for example, left portion of the image page (e.g., in pixels of the left-most vertical pixel line of the image page).

In error diffusion halftoning, start-up artifact is generally avoided by introducing random errors in pixels that are in the top and/or left portion of an image page. For example, in FIG. 1, random errors are introduced in at least some of the pixels in the top-most horizontal pixel line. Such introduction of random errors counters, at least in part, the effects of start-up artifacts at the top of the image page of FIG. 1.

FIG. 2 schematically illustrates an image page 200 that includes an image A, an image B and an image C (although the image page 200 can include any other number of images). A halftone image of the image page 200 is generated and printed in a printing device. Although images A, B and C are illustrated having specific shapes, sizes, colors, and relative positions, in various other embodiments, these images can have any shape, size, color and/or relative positions. For example, the images can correspond to any real life images that are generally printed in a printer. The page 200 has white spaces in between images A, B and/or C. For example, FIG. 2 illustrates white space 204 between images A and B.

To avoid start-up artifact in the image page 200, random errors are generally introduced in, for example, pixels included in the top-most horizontal pixel line and/or left-most vertical pixel line of the image page 200. Accordingly, in the generated halftone image, the top portion and/or the left portion of the image A do not generally have visible start-up artifact.

However, after the pixels of the image A is processed during the error diffusion halftoning, a plurality of pixels in the white space 204 is processed. While processing the pixels in the white space 204, the accumulated errors corresponding to the pixels tend to approach towards zero, e.g., if an error reduction algorithm is implemented (if such error reduction algorithm is not turned on, the accumulated errors continue to propagate, but tend towards a set of non-zero, homogenous values). That is, while processing the pixels in the white space 204, the accumulated errors of pixels decrease with processing of more and more white pixels. Thus, if the white space 204 is relatively large (e.g., if the white space 204 includes relatively large number of pixels), by the time pixels in the top portion of the image B is processed, the associated accumulated errors are about zero. Accordingly, in the generated halftone image, the top portion and/or the left portion of the image B have start-up artifact. For similar reasons, in the generated halftone image, the top portion and/or the left portion of the image C also have start-up artifact.

On the other hand, if the white space 204 is relatively small (e.g., if the white space 204 includes relatively small number of pixels), by the time pixels in the top portion if the image B is processed, the associated accumulated errors do not reach zero. That is, in such a case, the accumulated errors in pixels in the top portion of the image B is a function of errors propagated from pixels of image A. In such a case, in the generated halftone image, the top portion of image B will depend on tone levels of image A (e.g., tone levels of bottom portion of image A).

That is, although images A and B are two distinct images (e.g., separated by white space 204), halftoning of image B is based on location of the image B relative to image A. On the other hand, although not illustrated in FIG. 2, if positions of image B and image A are interchanged, then halftoning of image A will be based on location of the image A relative to image B. The manner in which the halftone images corresponding to images A, B and/or C are generated, and the manner in which the images A, B and/or C are printed, therefore, depend on relative positions of these images. Such dependence may be undesirable.

SUMMARY

The present disclosure provides a method comprising processing a first pixel of a continuous tone image to generate a first error, the first error representative of a difference between an input level and an output level associated with the first pixel; and in response to processing the first pixel, assigning a random error to a second pixel that is neighboring the first pixel, wherein the assigned random error is independent of the first error. Other embodiments are also described and claimed.

There is also provided a method comprising processing a target pixel in a continuous tone image to generate a first error associated with the target pixel, the first error representative of a difference between an input level and an output level associated with the target pixel; selecting a plurality of pixels neighboring the target pixel; randomly selecting a pixel from the plurality of pixels, wherein a group of pixels comprises all the pixels of the plurality of pixels except the randomly selected pixel; assigning, to each pixel of the group of pixels, a corresponding portion of the first error; determining an error difference that is representative of a difference between (i) the first error and (ii) a sum of the portions of the first error assigned to the pixels of the group of pixels; and assigning the error difference to the randomly selected pixel.

There is also provided a system comprising a halftone image generation module configured to receive a continuous tone image and generate a corresponding halftone image; and a print engine module configured to process the halftone image to facilitate printing of the halftone image; wherein the halftone image generation module comprises (i) a target pixel processing and error generation module configured to process a first pixel in the continuous tone image to generate a first error, the first error representative of a difference between an input level and an output level associated with the first pixel; and (ii) an error propagation module configured to, in response to the processing of the first pixel, assign a random error to a second pixel that is neighboring the first pixel.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments of the disclosure are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the teachings of the disclosure may be practiced.

Various operations may be described as multiple discrete operations in turn, in a manner that may be helpful in understanding embodiments of the present disclosure; however, the order of description should not be construed to imply that these operations are order dependent.

For the purposes of the present disclosure, the phrase "A/B" means A or B. For the purposes of the present disclosure, the phrase "A and/or B" means "(A), (B), or (A and B)." For the purposes of the present disclosure, the phrase "at least one of A, B, and C" means "(A), (B), (C), (A and B), (A and C), (B and C), or (A, B and C)." For the purposes of the present disclosure, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring again to FIG. 2, in various embodiments and as explained in more detail herein later, pixels in the white space 204 are identified, and while processing a target pixel in the white space 204, random errors (e.g. instead of pre-determined portions of an error generated while processing the target pixel) are propagated to one or more neighboring pixels of the target pixel. Such random propagation of errors for the pixels in the white space 204 ensures, for example, that the pixels in the top portion and/or left portion of the image B have random accumulated error. Accordingly, the generated halftone image corresponding to image B is not based on the position of image B relative to image A.

Figure 2:
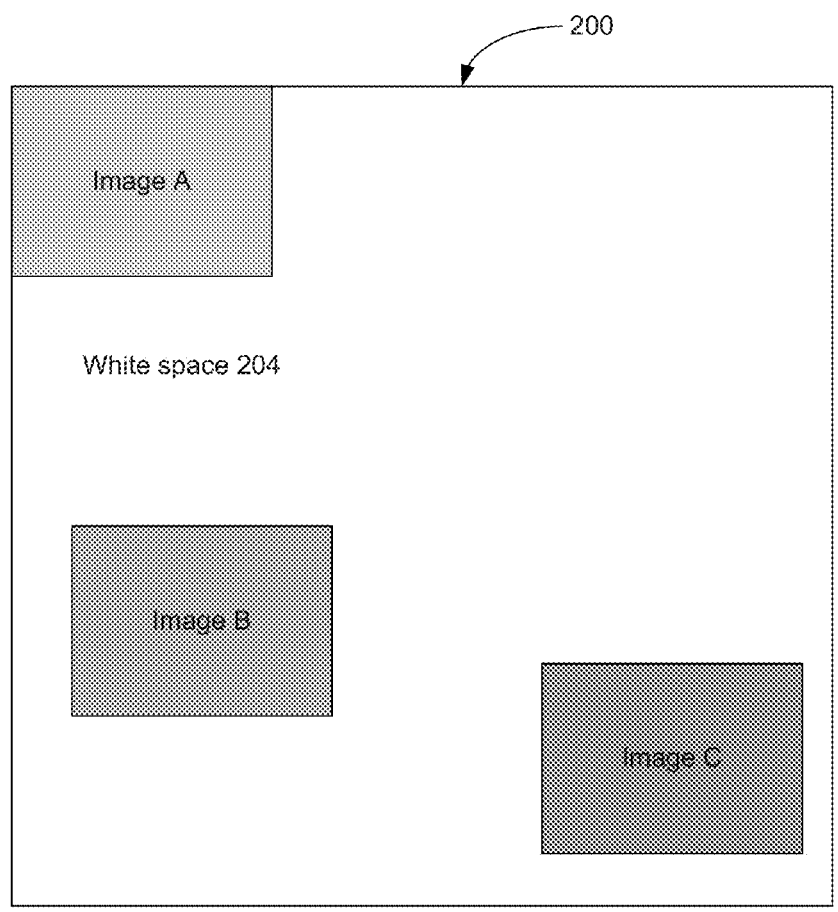
FIG. 2 schematically illustrates an image page that includes at least an image A, an image B and an image C.
Figure 3:
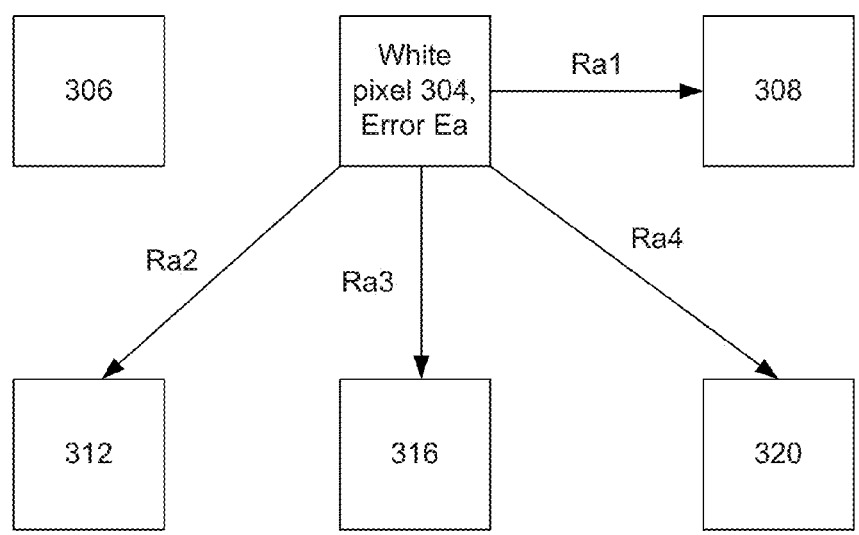
FIGS. 3-4 schematically illustrate random propagation of errors while processing target pixels using error diffusion halftoning, in accordance with various embodiments of the present disclosure.

FIG. 3 schematically illustrates random propagation of error while processing a target pixel 304 using error diffusion halftoning, in accordance with various embodiments of the present disclosure. In various embodiments, the target pixel 304 is a white pixel, i.e., represents the color white. In various embodiments, the target pixel 304 is located, for example, in the white space 204 of FIG. 2. FIG. 3 also illustrates a plurality of neighboring pixels 306, 308, 312, 316 and 320, which are neighboring the target pixel 304. In an example, the pixel 306 has already been processed, and currently the target pixel 304 is being processed to generate an halftone output level for target pixel 304 based at least in part on an input level of the target pixel 304 and an accumulated error of the target pixel 304.

Figure 1:
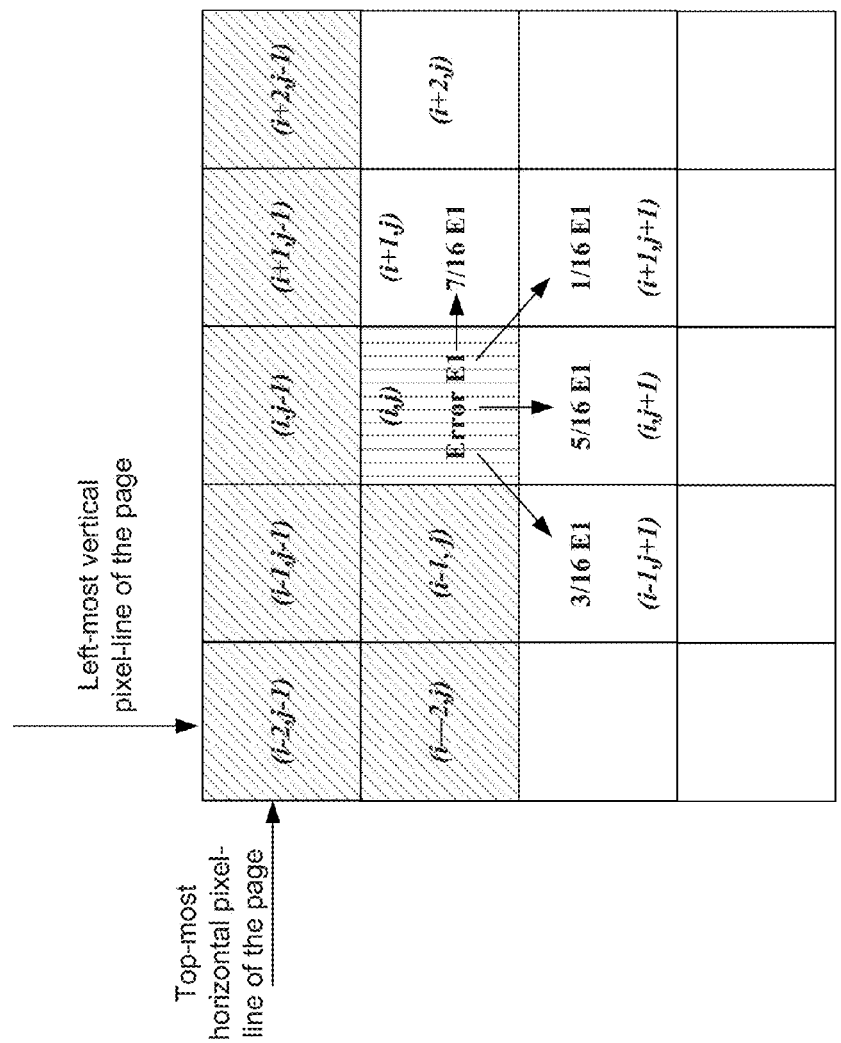
FIG. 1 schematically illustrates error propagation in an error diffusion halftoning process.

While processing the target pixel 304, an error Ea is generated (e.g., similar to generation of error E1 in FIG. 1). In various embodiments, random errors are propagated to one or more neighboring pixels of the target pixel 304 (e.g., instead of propagating pre-determined portions of the generated error Ea to the neighboring pixels), while processing the target pixel 304. For example, error Ra1 is assigned to the pixel 308, error Ra2 is assigned to the pixel 312, error Ra3 is assigned to the pixel 316, and error Ra4 is assigned to the pixel 320, where Ra1, . . . , Ra4 are random numbers. In various embodiments, errors Ra1, . . . , Ra4 are randomly selected to be within an acceptable error range. For example, if, during the error diffusion halftoning, a range of errors generated while processing various pixels is between −255 to +255, then each of the errors Ra1, . . . , Ra4 are randomly selected to be in between −255 and +255. In another example, if, during the error diffusion halftoning, a range of errors generated while processing various pixels is between −255 to +255, then each of the errors Ra1, . . . , Ra4 are randomly selected to be in between, e.g., −64 and +64.

In some embodiments, the assigned errors Ra1, . . . , Ra4 are randomly selected, independent of the generated error Ea. In other embodiments, the assigned errors Ra1, . . . , Ra4 are randomly selected, but are dependent of the generated error Ea.

Thus, unlike FIG. 1 where the error E1 was propagated to neighboring pixels of the pixel (i,j) in a deterministic manner, in FIG. 3 random errors are propagated to neighboring pixels of the target pixel 304 while processing the target pixel 304. Such random propagation of the errors ensures, for example, that the pixels in the top portion (and also in the left portion) of the image B of FIG. 2 has random accumulated error, and also ensures that the image B (and also images A and C) of FIG. 2 is mostly free from any visible start-up artifacts. Furthermore, due to the random propagation of errors, the halftone image corresponding to images A, B and C are independent of the relative position of these images in the image page 204. (It is to be noted that in some embodiments, the random errors are assigned such that the assigned random errors for a pixel are at least in part dependent on the generated error (e.g., error Ea) for the pixel. In some of these embodiments, the halftone image corresponding to images A, B and C are in part dependent of the relative position of these images).

Figure 4:
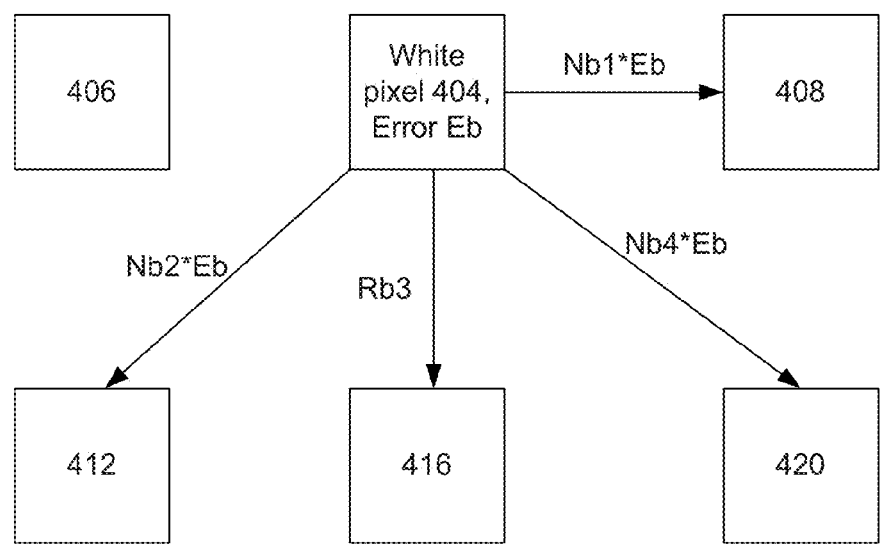

FIG. 4 schematically illustrates random propagation of errors while processing a target pixel 404 using error diffusion halftoning, in accordance with various embodiments of the present disclosure. In various embodiments, the target pixel 404 is a white pixel and is located, for example, in the white space 204 of FIG. 2. FIG. 4 also illustrates a plurality of pixels 406, 408, 412, 416 and 420 which are neighboring the target pixel 404. In an example, the pixel 406 has already been processed, and currently the pixel 404 is being processed (i.e., the pixel 404 is the target pixel) to generate an halftone output level for target pixel 404 based at least in part on an input level of the target pixel 404 and the accumulated error of the target pixel 404.

While processing the target pixel 404, an error Eb is generated (e.g., similar to generation of error Ea in FIG. 3). In various embodiments, random errors are propagated to pixels of a first group of neighboring pixels of the target pixel 404, while pre-determined portions of the error Eb are propagated to pixels of a second group of the neighboring pixels of the target pixel 404. For example, error (Nb1*Eb) (i.e., Nb1$^{th}$ portion of the error Eb) is assigned to the pixel 408; error (Nb2*Eb) (i.e., Nb2$^{th}$ portion of the error Eb) is assigned to the pixel 412; a random error Rb3 is assigned to the pixel 416; and error (Nb4*Eb) (i.e., Nb4$^{th}$ portion of the error Eb) is assigned to the pixel 420, where Rb3 is randomly selected to be, for example, within a range of acceptable errors (e.g., between −255 and +255). In an example, Nb1, Nb2 and Nb4 are pre-determined and equal to about $7/16$, $3/16$ and $1/16$, respectively. In various embodiments, the random error Rb3 is selected such that the random error Rb3 is independent of the error Eb. In various other embodiments, the random error Rb3 is selected such that the random error Rb3 is dependent on the error Eb.

As an example, a range of acceptable errors is between −255 and +255. To assign the random error Rb3, a random number rb3 is randomly chosen between −255 and +255, and the random error Rb3 is equal to (Nb3*rb3) (e.g., Nb3$^{th}$ portion of rb3), where Nb3 is pre-determined. If Nb1, Nb2 and Nb4 are equal to about 7/16, 3/16 and 1/16, respectively, then Nb3 is equal to about 5/16 (i.e., Nb1+Mb2+Nb3+Nb4=1). That is, Rb3 is randomly chosen between −80 and +80.

Unlike FIG. 3 where random errors were propagated to the neighboring pixels of the target pixel 404, in FIG. 4 pre-determined portions of the error Eb of the target pixel 404 is propagated to a first one or more neighboring pixels and random errors are propagated to a second one or more neighboring pixels. In various embodiments, as only a small number of the neighboring pixels of the target pixel 404 receives random error, this results in the actual accumulated errors of the pixels in the white space 204 (e.g., instead of random errors) to propagate further in the white space 204 of FIG. 2.

Furthermore, in FIG. 4, only the neighboring pixel 416, which is at the bottom of the target pixel 404, is assigned random error values. On the other hand, portions of the error Eb is propagated to other neighboring pixels (e.g., pixels 408, 412 and 420), which are to the left and right of the target pixel 404, in a deterministic manner. Accordingly, for example, if the target pixel 404 is near to a right edge of image A, such deterministic propagation of error Eb to neighboring pixels to the right and left of the target pixel 404 ensures that the vertical edge of the image A in the generated halftone image is relatively more accurately generated.

Although FIG. 4 illustrates propagation of random error to only one neighboring pixel 416, in various other embodiments, the random errors are propagated to more than one neighboring pixels (e.g., to pixels 416 and 420) of the target pixel 404. In various embodiments, one or more pixels (e.g., pixel 416), to which random errors are assigned, are randomly selected from the neighboring pixels 408, . . . , 420. In various embodiments, a pixel (e.g., pixel 416), which is located in a specific direction (e.g., bottom direction) relative to the target pixel 404, is selected for assignment of random error.

Figure 5:
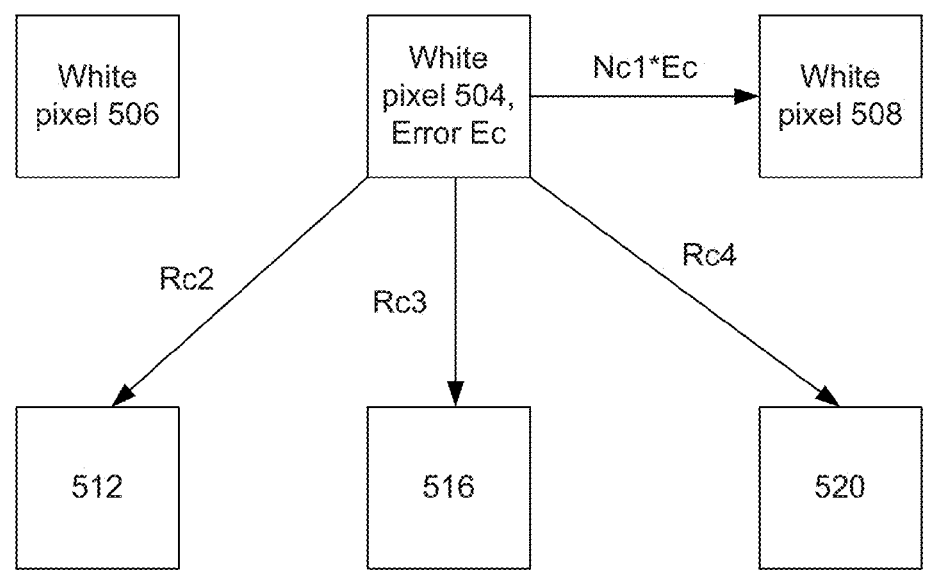
FIG. 5 schematically illustrates random propagation of error while processing a target pixel that is located among a plurality of white pixels, in accordance with various embodiments of the present disclosure.

In FIGS. 3 and 4, if a target pixel is a white pixel, random errors are propagated to one or more neighboring pixels. In various other embodiments, while processing a target pixel, random errors are propagated to one or more neighboring pixels only if the target pixel is a white pixel and the target pixel has one or more neighboring white pixels. FIG. 5 schematically illustrates random propagation of error while processing a target pixel 504 that is located among a plurality of white pixels, in accordance with various embodiments of the present disclosure. FIG. 5 includes the target pixel 504 (which, for example, is a white pixel), and a plurality of neighboring pixels 506, 508, 512, 516 and 520 (e.g., which are neighboring the target pixel 504). In various embodiments, the pixel 506 has already been processed, and currently the pixel 504 is currently being processed (i.e., the pixel 504 is the target pixel) to generate an halftone output level for target pixel 504 based at least in part on an input level of the target pixel 504 and an accumulated error of the target pixel 504.

In various embodiments, at least the pixels 506 and 508 are also white pixels. Thus, the target pixel 504 is located among a plurality of white pixels 506 and 508. While processing the target pixel 504, an error Ec is generated (e.g., similar to generation of error Ea in FIG. 3).

In various embodiments, while processing the white target pixel 504, it is determined that at least some of the neighboring pixels (e.g., at least a threshold number of neighboring pixels) are also white pixels (e.g., it is determined that neighboring pixels 506 and 508 are white pixels). In various embodiments, based on such determination, random errors are propagated to one or more neighboring pixels (e.g., pixels 512, 516 and 520) of the target pixel 504, while pre-determined portions of the error Ec are propagated to another one or more other neighboring pixels (e.g., pixel 508) of the target pixel 504. For example, (i.e., Nc1*Ec) (i.e., Nc1$^{th}$ portion of the error Ec) is assigned to the pixel 508; a random error Rc2 is assigned to the pixel 512; a random error Rc3 is assigned to the pixel 516; and a random error Rc4 is assigned to the pixel 520, where Rc2, Rc3 and Rc4 are randomly selected. In various embodiments, Rc2, Rc3 and Rc4 are randomly selected to be, for example, within a range of acceptable errors (e.g., between −255 and +255). In an example, Nc1 is pre-determined and equal to about 7/16.

Propagating errors randomly to all downward pixels (i.e., to pixels 512, 516 and 520), while processing the target pixel 504 located amongst other while pixels, has several advantages. For example, such propagation ensures that errors are propagated deterministically for pixels that are located at or near vertical edges of an image (e.g., so that vertical edge of the image is relatively more accurately represented in the generated halftone image), and that errors of pixels located in the white space 204 are propagated randomly downwards in a effective and fast manner.

Although FIG. 5 illustrates only two white pixels neighboring the target pixel 504, in various embodiments, random errors are propagated to one or more neighboring pixels only if the target pixel 504 is located amongst a plurality of white pixels. For example, random errors are propagated to one or more neighboring pixels only if all the adjacent or neighboring pixels of the target pixel 504 are white, only if a top and a bottom pixel of the target pixel 504 are white, only if at least two immediately adjacent pixel to the left and/or at least two immediately adjacent pixel to the right of the target pixel 504 are white, and/or the like.

For at least some of the embodiments of FIGS. 3-5, one or more rules can be developed while randomly assigning errors to neighboring pixels of a target pixel. In various embodiments, while processing a target pixel, random errors are assigned to neighboring pixels such that a sum of the assigned random errors is equal to about zero. For example, in FIG. 3, sum of the random errors Ra1, . . . , Ra4 is equal to about zero. In another example, in FIG. 5, sum of the random errors Rc2, . . . , Rc4 is equal to about zero.

In various embodiments, instead of the random errors being white noise, the random errors are dependent on the tone being processed. For example, while processing a target pixel, random errors can be assigned to the neighboring pixels based at least in part on a tone of a local area of the image page. For example, while processing a target pixel, random errors can be assigned to the neighboring pixels based at least in part on input levels or image tone of one or more pixels that were processed immediately before processing the target pixel. For example, a mean and/or a standard deviation used for generating the random errors are based on a tone of the local area of the image page in which the target pixel is located (e.g., tone of one or more pixels that were processed immediately before processing the target pixel).

In various embodiments, instead of the assigned random errors being white noise, the assigned random errors may be dependent on the error value for the pixel being processed. For example, while processing a target pixel, random errors can be assigned to the neighboring pixels based at least in part on the error value of the pixel being processed.

For example, if the target pixel is located in a relatively darker area of an image page (e.g., if the input levels of pixels, processed immediately before processing the target pixel, have relatively higher input levels), the random errors, which are to be propagated to neighboring pixels, are selected from a lower range of an acceptable range of errors (e.g., the mean and the standard deviation of the random errors are shifted such that the random errors are mostly selected to be between about −255 to about −100 for an acceptable error range of −255 to +255). On the other hand, if the target pixel is located in a relatively lighter area of the image page (e.g., if the input levels of pixels, processed immediately before processing the target pixel, has relatively lower input levels), the random errors, which are to be propagated to neighboring pixels, are selected from a middle range of an acceptable range of errors (e.g., the mean and the standard deviation of the random errors are shifted such that the random errors are mostly selected to be between about −50 to about +50 for an acceptable error range of −255 to +255). Such image tone dependent random error selection ensures, for example, that due to the propagation of random errors, lighter tone is not created in a relatively darker area of the image and/or darker tone is not created in a relatively lighter area of the image. In various embodiments, a correlation between a tone of a local area of an image page and an associated range of random errors is programmable.

Figure 6:
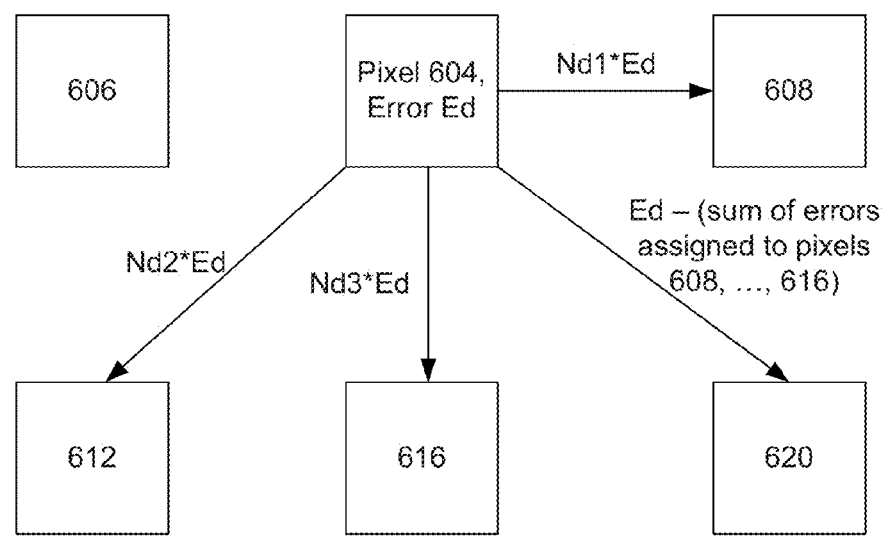
FIG. 6 schematically illustrates propagation of errors while processing a target pixel using error diffusion halftoning, in accordance with various embodiments of the present disclosure.

FIG. 6 schematically illustrates propagation of errors while processing a target pixel 604 using error diffusion halftoning, in accordance with various embodiments of the present disclosure. In various embodiments, the target pixel 604 can have any appropriate input levels. FIG. 6 also illustrates a plurality of pixels 606, 608, 612, 616 and 620 which are neighboring the target pixel 604. In an example, the pixel 606 has already been processed, and currently the pixel 604 is being processed (i.e., the pixel 604 is the target pixel) to generate an halftone output level for target pixel 604 based at least in part on an input level of the target pixel 604 and the accumulated error of the target pixel 604. While processing the target pixel 604, an error Ed is generated (e.g., similar to generation of error Ea in FIG. 3).

In various embodiments, neighboring pixels 608, . . . , 620 are selected, to which the error Ed is to be propagated. Also, a pixel from the neighboring pixels 608, . . . , 620 is selected (e.g., randomly selected from the neighboring pixels 608, . . . , 620). For example, in FIG. 6, pixel 620 is randomly selected from the neighboring pixels 608, . . . , 620. A group of pixels comprises all the pixels of the neighboring pixels 608, . . . , 620, except the randomly selected pixel. Thus, group of pixels comprises pixels 608, 612 and 616.

In various embodiments, to each pixel in the group of pixels, a corresponding portion of the error Ed is assigned. For example, error (Nd1*Ed) (i.e., $Nd1^{th}$ portion of the error Ed) is assigned to the pixel 608; error (Nd2*Ed) (i.e., $Nd2^{th}$ portion of the error Ed) is assigned to the pixel 612; and error (Nd3*Ed) (i.e. $Nd3^{th}$ portion of the error Ed) is assigned to the pixel 616, where Nd1, Nd2 and Nd3 are pre-determined and/or are programmable.

In an example, Nd1, Nd2 and Nd3 are equal to about 7/16, 3/16 and 5/16, respectively. For these example values of Nd1, Nd2 and Nd3, in a conventional system (e.g., in FIG. 1), $1/16^{th}$ portion of the error Ed is generally assigned to the pixel 620.

However, due to rounding off of errors, it is difficult to assign, for example, exactly Nd1*Ed to pixel 608. For example, for Ed equal to an example value of 1 and Nd1 equal to 7/16, an error of 0.4375 needs to be assigned to the pixel 608 of FIG. 6. But due to rounding off, an error of 0.44 (e.g., instead of 0.4375) may actually be assigned to the pixel 608. Accordingly, although a combined $15/16^{th}$ portion of the error Ed needs to be assigned to pixels 608, 612 and 616, in practice, the actual error assigned to these three pixels may be different.

Accordingly, instead of assigning $1/16^{th}$ portion of the error Ed, the pixel 620 is assigned an error difference, which is equal to a difference between (i) error Ed and (ii) a sum of errors assigned to pixels 608, . . . , 616. Such assignment of the error difference to the pixel 620 (e.g., instead of assigning $1/16^{th}$ portion of the error Ed ensures, for example, that the total error propagated to the neighboring pixels of the target pixel 604 is substantially equal to the error Ed. In contrast, due to rounding off of errors, a total error propagated to the neighboring pixels of the target pixel 104 of FIG. 1 may not be equal to E1, which may create undesirable visible artifacts in the printed image for certain image patterns.

Furthermore, the pixel 620 is randomly selected from the pixels 608, . . . , 620 for receiving the error difference (e.g., instead of a pre-determined portion of the error Ed). There are advantages of selecting a neighboring pixel randomly each time a target pixel is processed (e.g., instead of always selecting, for example, a pixel to the right of the target pixel for assigning the error difference). For example, such random selection of a pixel for assignment of the error difference ensures that for certain image patterns, no undesirable visible artifacts are generated in the printed image due to the assignment of the error difference.

Although in FIGS. 3-6, errors are propagated to only four neighboring pixels while processing a target pixel, in various other embodiments, errors can be propagated to any other appropriate number of neighboring pixels (e.g., to twelve neighboring pixels), and the teachings of this disclosure is not limited to a number of neighboring pixels (or a choice of neighboring pixels) to which errors are propagated while processing the target pixel.

Figure 7:
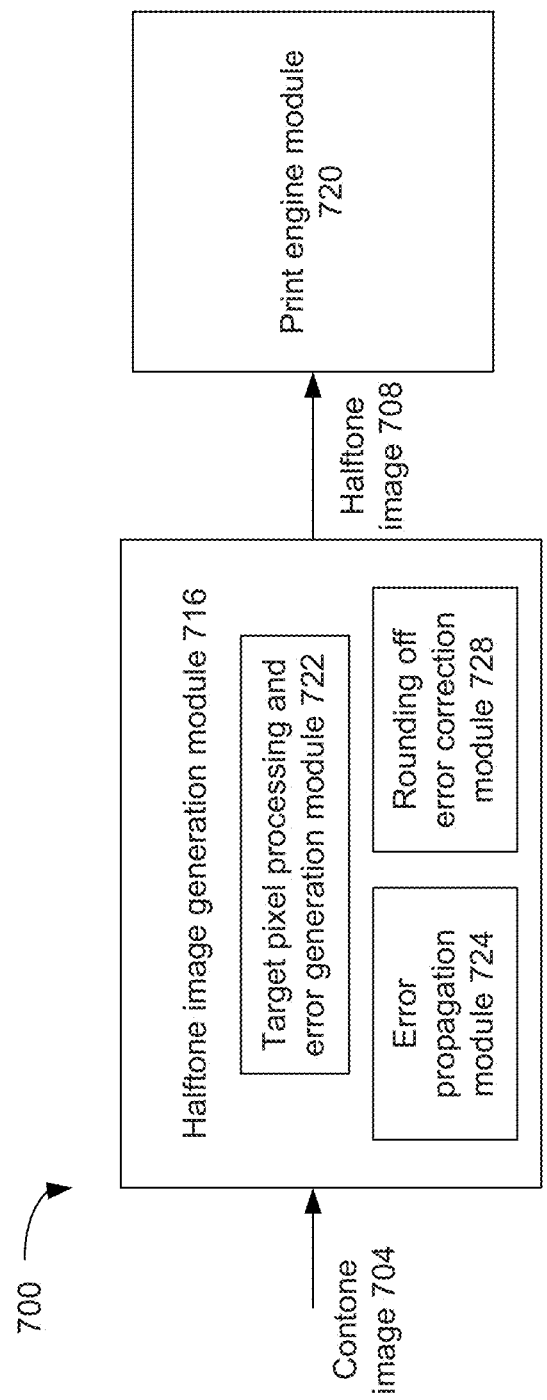
FIG. 7 schematically illustrates a block diagram of a printing system, in accordance with various embodiments of the present disclosure.

FIG. 7 schematically illustrates a block diagram of a printing system 700, in accordance with various embodiments of the present disclosure. The printing system 700 includes a halftone image generation module 716 configured to receive a contone image 704 and to generate a corresponding halftone image 708. A print engine module 720 is configured to receive and process the halftone image 708, and/or print the processed halftone image 708 in an appropriate printing medium.

The contone image 704 is received from any appropriate image source, e.g., a consumer electronics device, an image capturing device, a desktop, a laptop, a camera, a fax machine, a mobile phone, and/or any appropriate device capable of generating, processing and/or transmitting a contone image. In various embodiments, the print engine 720 may be included in, for example, a printing device (e.g., an inkjet printer, a laser printer, and/or the like). In various embodiments, the halftone image generation module 716 may be a part of the device from which the contone image is received, and/or may be a part of a printing device in which the print engine 720 is included.

In various embodiments, the halftone image generation module 716 includes a target pixel processing and error generation module 722, an error propagation module 724, and a rounding off error correction module 728. In various other embodiments, only one of the error propagation module 724 and the rounding off error correction module 728 is present in the halftone image generation module 716.

Figure 8:
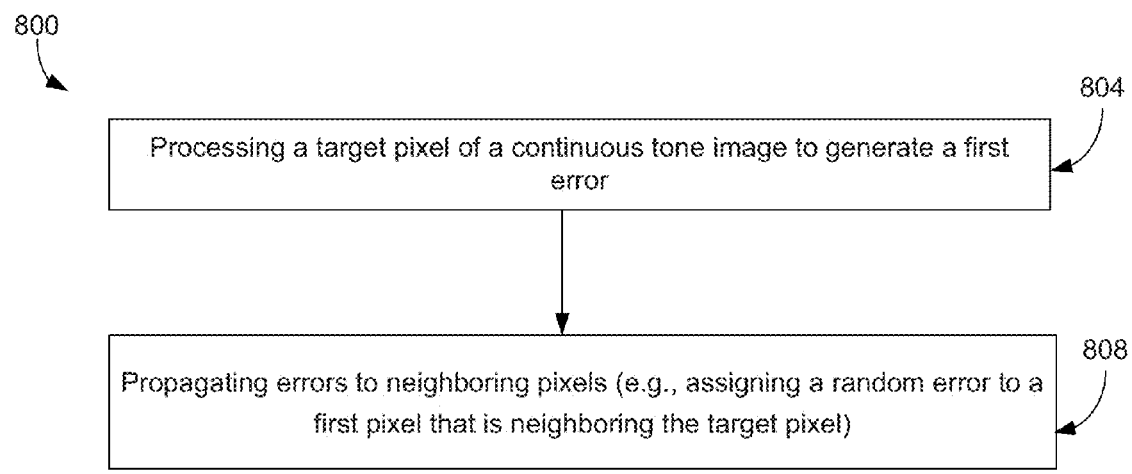
FIGS. 8 and 9 are flowcharts describing methods for operating the printing system of FIG. 7, in accordance with various embodiments of the present disclosure.

Operations of various elements of the system 700 is explained with respect to FIG. 8, which is a flowchart describing a method 800 in accordance with various embodiments of the present disclosure. At 804, the target pixel processing and error generation module 722 processes a target pixel (e.g., target pixels 304, 404 or 504 of FIGS. 3-5) of a continuous tone image to generate a first error (e.g., errors Ea, Eb or Ec). At 808, the error propagation module 724 propagates errors to neighboring pixels. For example, the error propagation module 724 assigns a random error to a first pixel that is neighboring the target pixel. For example, as illustrated in FIG. 3, a random error Ra1 is assigned to pixel 308. In various embodiments, the assigned random error to the first pixel is independent of the first error. Although not illustrated in FIG. 8, in various embodiments, the error propagation module 724 also assigns a pre-determined portion of the first error to a second pixel (e.g., assigns $Nc1^{th}$ portion of the error Ec to pixel 508) that is neighboring the target pixel.

Figure 9:
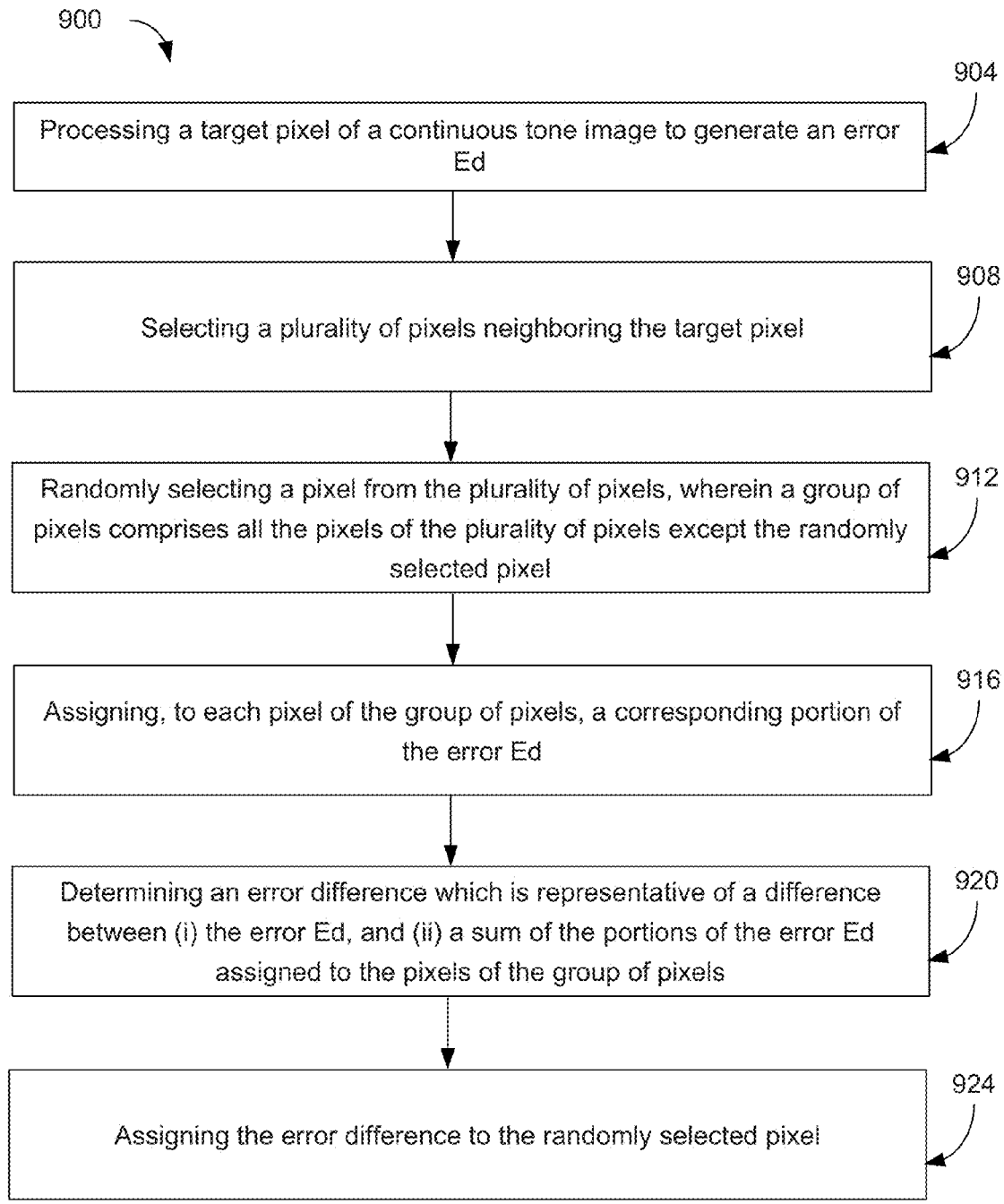

FIG. 9 is a flowchart describing a method 900 in accordance with various embodiments of the present disclosure. At 904, the target pixel processing and error generation module 722 processes a target pixel (e.g., target pixel 604 of FIG. 6) of a continuous tone image to generate an error Ed. At 908, the rounding off error correction module 728 selects a plurality of pixels (e.g., pixels 608, . . . , 620) neighboring the target pixel for assigning errors. At 912, the rounding off error correction module 728 randomly selects a pixel (e.g., pixel 620) from the plurality of pixels, where a group of pixels comprises all the pixels of the plurality of pixels except the randomly selected pixel 620. At 916, the rounding off error correction module 728 assigns, to each pixel of the group of pixels, a corresponding portion of the error Ed. For example, as illustrated in FIG. 6, error (Nd1*Ed) (i.e., $Nd1^{th}$ portion of the error Ed) is assigned to the pixel 608, error (Nd2*Ed) (i.e., $Nd2^{th}$ portion of the error Ed) is assigned to the pixel 612, and so on. At 920, the rounding off error correction module 728 determines an error difference, which is representative of a difference between (i) the error Ed and (ii) a sum of the portions of the error Ed assigned to the pixels of the group of pixels. At 924, the rounding off error correction module 728 assigns the determined error difference to the randomly selected pixel 620.

In accordance with various embodiments, an article of manufacture may be provided that includes a storage medium having instructions stored thereon that, if executed, result in the operations described herein with respect to FIGS. 3-6 and 8-9. In an embodiment, the storage medium comprises some type of memory (not shown). In accordance with various embodiments, the article of manufacture may be a computer-readable medium such as, for example, software or firmware.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This disclosure is intended to cover any adaptations or variations of the embodiments discussed herein. Therefore, it is manifestly intended that embodiments described herein be limited only by the claims and the equivalents thereof.

What is claimed is:

1. A method comprising:
   processing, by a halftone image generation module, a first pixel of a continuous tone image to generate a first error, the first error representative of a difference between an input level and an output level associated with the first pixel; and
   in response to processing the first pixel, assigning, by the halftone image generation module, a random error to a second pixel that is neighboring the first pixel, wherein the random error assigned to the second pixel is independent of the first error that is representative of the difference between the input level and the output level associated with the first pixel, and wherein the random error assigned to the second pixel is useable by the halftone image generation module to generate an halftone output level for the second pixel,
   wherein said assigning the random error to the second pixel comprises
      determining that input levels of (i) at least a threshold number of pixels neighboring the first pixel and (ii) the first pixel substantially represent a white color, and
      in response to determining that input levels of (i) at least the threshold number of pixels neighboring the first pixel and (ii) the first pixel substantially represent the white color, assigning the random error to the second pixel.

2. The method of claim 1, further comprising:
   in response to processing the first pixel, assigning a pre-determined portion of the first error to a third pixel that is neighboring the first pixel.

3. The method of claim 1, wherein said assigning the random error to the second pixel further comprises:
   determining that input levels of (i) at least one pixel that is located in a specific direction relative to the first pixel in the continuous tone image and (ii) the first pixel substantially represent a white color; and
   in response to determining that input levels of (i) the at least one pixel and (ii) the first pixel substantially represent the white color, assigning the random error to the second pixel.

4. The method of claim 1, wherein said assigning the random error to the second pixel further comprises:
   selecting a plurality of pixels neighboring the first pixel;
   randomly selecting the second pixel from the plurality of pixels; and
   assigning the random error to the randomly selected second pixel.

5. The method of claim 1, wherein said assigning the random error to the second pixel further comprises:
   selecting a plurality of pixels neighboring the first pixel in the continuous tone image, the plurality of pixels including the second pixel;
   determining that the second pixel of the plurality of pixels is located below the first pixel; and
   in response to determining that the second pixel is located below the first pixel, assigning the random error to the second pixel.

6. The method of claim 2, wherein said assigning the pre-determined portion of the first error to the third pixel further comprises:
   determining that the third pixel is located in a specific direction relative to the first pixel in the continuous tone image; and
   in response to determining that the third pixel is located in the specific direction, assigning the pre-determined portion of the first error to the third pixel.

7. The method of claim 2, further comprising:
   generating the random error such that random error is within an error range, wherein the error range is based at least in part on input levels of one or more pixels that were processed before processing the first pixel.

8. A system comprising:
   a halftone image generation module configured to receive a continuous tone image and generate a corresponding halftone image; and
   a print engine module configured to process the halftone image to facilitate printing of the halftone image,
   wherein the halftone image generation module comprises
      (i) a target pixel processing and error generation module configured to process a first pixel in the continuous tone image to generate a first error, the first error representative of a difference between an input level and an output level associated with the first pixel, and (ii) an error propagation module configured to, in response to the processing of the first pixel, determine that input levels of (i) at least one pixel that is located in a specific direction relative to the first pixel in a continuous tone image and (ii) the first pixel substantially represent a white color, and in response to determining that input levels of (i) at least one pixel that is located in a specific direction relative to the first pixel in a continuous tone image and (ii) the first pixel substantially represent the white color, assign a random error to a second pixel that is neighboring the first pixel, wherein the random error assigned to the second pixel is useable by the halftone image generation module to generate an halftone output level for the second pixel.

9. The system of claim 8, wherein the assigned random error to the second pixel is independent of the first error.

10. The system of claim 8, wherein in response to the processing of the first pixel, the error propagation module is further configured to assign a pre-determined portion of the first error to a third pixel that is neighboring the first pixel.

11. The system of claim 8, wherein:

the target pixel processing and error generation module is further configured to process a target pixel in the continuous tone image to generate a second error associated with the target pixel, and the halftone image generation module further comprises a rounding off error correction module configured to select a plurality of pixels neighboring the target pixel;

randomly select a third pixel from the plurality of pixels, wherein a group of pixels comprises all the pixels of the plurality of pixels except the target pixel;

assign, to each pixel of the group of pixels, a corresponding portion of the second error;

determine an error difference that is representative of a difference between (i) the second error and (ii) a sum of the portions of the second error assigned to the pixels of the group of pixels; and assign the error difference to the third pixel.

12. The system of claim 8, wherein the error propagation module is further configured to:

select a plurality of pixels neighboring the first pixel;

randomly select the second pixel from the plurality of pixels; and assign the random error to the randomly selected second pixel.

13. The system of claim 8, wherein the error propagation module is further configured to:

determine that the second pixel is located below the first pixel in a continuous tone image; and based on determining that the second pixel is located below the first pixel, assign the random error to the randomly selected second pixel.

14. The system of claim 8, wherein the error propagation module is further configured to:

select a plurality of pixels neighboring the first pixel for assigning errors, the plurality of pixels including the second pixel; and in response to processing the first pixel, assign random errors to each pixel of the plurality of pixels.

15. The system of claim 9, wherein the error propagation module is further configured to:

determine that the third pixel is located in a specific direction relative to the first pixel in a continuous tone image; and in response to determining that the third pixel is located in the specific direction, assign the pre-determined portion of the first error to the third pixel.

\* \* \* \* \*